United States Patent [19]

Ruland

[11] 4,123,192

[45] Oct. 31, 1978

[54] TAPPING ATTACHMENT FOR A MACHINE TOOL

[76] Inventor: Frederick W. Ruland, 59 Lincoln St., Waltham, Mass. 02154

[21] Appl. No.: 840,742

[22] Filed: Oct. 11, 1977

[51] Int. Cl.² .............. B23B 47/14; B23B 47/00; B23G 1/00
[52] U.S. Cl. .................... 408/133; 408/134; 10/89 F
[58] Field of Search .......... 408/125, 132, 133, 134; 10/89 F, 141 H, 140

[56] References Cited

U.S. PATENT DOCUMENTS

| 3,717,892 | 2/1973 | Johnson | 408/134 |
| 4,008,647 | 2/1977 | Hague et al. | 408/133 |

Primary Examiner—Harrison L. Hinson
Attorney, Agent, or Firm—Kenway & Jenney

[57] ABSTRACT

A tapping attachment for a machine having at least one rotating workpiece spindle and associated coaxial tool drive shaft. The tapping attachment couples a tapping tool to the drive shaft in a manner selectively controlling the tool to rotate with respect to a workpiece attached at one of two predetermined velocities in the same direction as the spindle. The attachment is selectively adapted so that one of the two velocities is above and the other below that of the spindle.

11 Claims, 3 Drawing Figures

FIG. 3

TAPPING ATTACHMENT FOR A MACHINE TOOL

BACKGROUND OF THE INVENTION

This invention relates to machine tools, and more particularly to tapping attachments for machine tools having a rotating workpiece spindle.

Generally, tapping is accomplished by first advancing a tapping tool into a hole-to-be-tapped with the tool rotating at a predetermined angular velocity in a first direction with respect to the workpiece, and then retracting the tool from the hole with the tool rotating at a predetermined angular velocity in the opposite direction. In practice, there have been many approaches to performing this operation. For example, with a conventional tapping tool having axial float and adapted for self-feeding, the tool may be held stationary while the workpiece is rotated in a first direction during advancement into the hole, and rotated in the opposite direction during retraction. Conventional reversible gearing may be used to control the workpiece spindle in this approach. Alternatively, the workpiece may be held stationary while the tapping tool is rotated in a first direction during the advancement portion of the cycle and in the opposite direction during the retraction portion of the cycle. The latter approach may be accomplished using reversible gearing configurations for coupling the tapping tool to the tool drive shaft. Alternatively, a constant velocity tool drive may be used in conjunction with a conventional reversible tapping attachment.

Under conditions when the appropriate speed drives and gearing configurations for the spindle and tapping tool drive shaft are available, the above-noted approaches are satisfactory. There are, however, many practical situations where these speeds are not available. For example, in a multiple spindle automatic screw machine, a plurality of workpiece spindles and associated coaxial tool positions are arranged in a multiple work station configuration so that a multiplicity of operations may be performed simultaneously on a machine having a single drive motor and associated main power shaft. Generally, the spindles and tool positions are disposed symmetrically about a central axis and the spindles are coupled on a carrouselled carrier which may be indexed about the central axis so that each spindle may be stepped around to each tool position. With this configuration, appropriate tools may be used as the various tool positions so that a succession of machining operations may be performed on all workpieces as the carrier is stepped about the central axis, remaining at each position for a period long enough to complete the longest operation in the succession. Since most commonly used machining operations (such as drilling) are best performed with the workpiece rotating at a relatively high speed with respect to the tool, multiple spindle machines are typically set-up to provide such a ratio of speeds for each work station. However, this ratio is generally an order of magnitude too high for tapping operations. Thus, for a multiple station machine where all the spindles are turning at speeds that are suitable for the majority of machining operations, tapping may be accomplished only with adaptive elements to reduce the speed ratio.

In the prior art, special gearing arrangements have been provided for adaptation to the machine's main power shaft using two friction clutches and a two-point pick-off. With this configuration, the workpiece spindle for a tapping work station is maintained at the normal speed while the gear and clutching arrangement adjusts the speed of the tool drive shaft so that the tapping tool may selectively be controlled to rotate at a speed somewhat greater than the workpiece speed, or at a speed somewhat slower than the workpiece speed. The gearing for coupling the tool drive shaft to the main power shaft is appropriately selected so that the differential speeds of the tapping tool with respect to the workpiece are appropriate for the desired tapping operation. However, this arrangement requires relatively complex and expensive gearing for controlling the tool drive shaft from the main power shaft. Furthermore, substantial set-up times are required for the installation of such gearing in conventional multiple spindles screw machines, thereby placing severe limits on machine productivity.

Accordingly, an object of the present invention is to provide a tapping attachment for a machine having a rotating workpiece spindle and tool drive shaft, where the tapping attachment couples a tapping tool to the drive shaft.

SUMMARY OF THE INVENTION

The present invention is a tapping attachment for a machine having at least one rotating workpiece spindle and associated coaxial tool drive shaft. The tapping attachment couples a tapping tool to the drive shaft in a manner selectively controlling the tool to rotate with respect to a workpiece attached at one of two predetermined velocities in the same direction as the spindle. The attachment is selectively adapted so that one of the two velocities is above and the other below that of the spindle.

In operation, tapping is achieved by rotating a workpiece attached to the spindle at a predetermined speed (for example, 1,000 rpm) about the axis of the hole-to-be-tapped. During the thread cutting portion of the tapping cycle with the tapping tool axially biased towards the workpiece, the tapping attachment controls the tool to rotate about the hole axis in the same direction as the workpiece but at a speed different from that of the workpiece, and to advance into the hole. Thus, the tool rotates in a first direction with respect to the workpiece at a first differential speed. Following advancement into the hole to the desired depth, the retraction portion of the cycle begins with the tapping tool axially biased away from the workpiece. The tapping attachment controls the tool to rotate about the hole axis in the same direction as the workpiece, but again at a speed different from that of the workpiece. Thus, during the retraction portion of the tapping cycle, the tool rotates with respect to the workpiece at a second differential speed. The speeds of the tapping tool during the insertion and retraction portions of the cycle are selected so that the first and second differential speeds have opposite polarities. In alternative arrangements, the sequence of the differential speeds may be reversed for the insertion and retraction portions of the cycle. Thus, either left or right-handed threads may be cut. The differential speeds of the tapping tool may also be controlled as desired, for example, to have a relatively long cutting time with a relatively short retraction time. In addition, the magnitude of the differential speeds may be readily controlled by the gearing selection. The present invention may be provided with conventional free axial float, providing self-feeding. Conventional techniques may also be used in conjunction with the present invention to provide depth stopping and clutching.

BRIEF DESCRIPTION OF THE DRAWINGS

The foregoing and other objects of this invention, the various features thereof, as well as the invention itself, may be more fully understood from the following description, when read together with the accompanying drawings, in which.

DESCRIPTION OF THE PREFERRED EMBODIMENT

Figure 1:
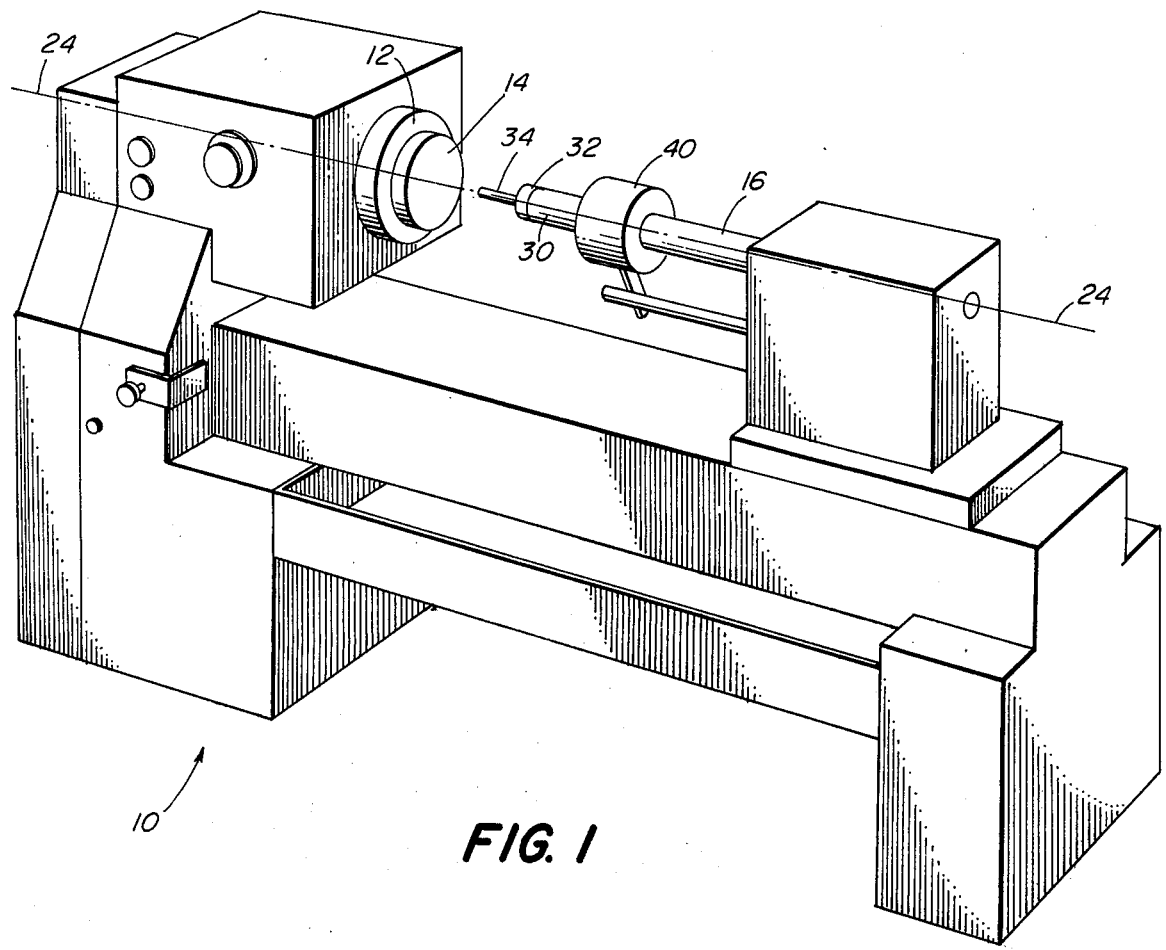
FIG. 1 shows a lathe having a tapping attachment in accordance with the present invention.

FIG. 1 shows a conventional lathe 10 having a workpiece spindle 12 and associated workpiece chuck 14, and tool drive shaft 16. The shaft 16 and spindle 12 are driven to rotate coaxially in the same direction about a reference axis 24 by a conventional drive assembly (not shown). FIG. 1 also shows a driven shaft 30 and tool chuck 32 coupled to a tapping tool 34.

A tapping attachment 40 in accordance with the present invention couples the driven shaft 30 and tapping tool 34 to drive shaft 16 so that those elements rotate coaxially with axis 24. The tapping attachment 40 and driven shaft 30 are shown in sectional view in FIG. 2, and in exploded form in FIG. 3. The tapping attachment 40 is principally enclosed within a housing 41 and extends along a longitudinal axis 41a. When attachment 40 is installed on lathe 10, axis 41a is coaxial with axis 24. Housing 41 includes a stop arm 41b which is adapted to engage a stationary portion of the lathe 10 to prevent housing 41 from rotating about axis 41a.

A driving pawl 42 at one end of the attachment 40 is conventionally adapted for direct coupling to the drive shaft 16. Pawl 42 is journalled to a housing 41 by way of matched ball bearing pair 42a and includes a skirt portion 43 having axially extending slots 44, 45 and 46. A bevel gear 48, having a central bore, is fixed to the housing 41 by way of roll pin 50. A bevel pinion carrier 52 carries three bevel pinions 54, 56 and 58, which are rotatably coupled to the carrier 52 by bevel pinion shafts 60, 62 and 64, respectively, which extend radially with respect to axis 41a. The bevel pinion carrier 52 includes three axially extending tangs (not shown) 68, 70 and 72 which are adapted to extend within slots 44, 45 and 46, respectively of the driving pawl 42.

A second bevel or sun gear 80 is positioned adjacent to the bevel pinion carrier 52 so that the bevel pinions 54, 56 and 58 each engage the bevel gears 48 and 80. The bevel gear 80 includes three interior tangs 82, 84 (not shown) and 86 (not shown). The gears 48 and 80, carrier 52 and skirt 43 of pawl 42 all have a central bore and are coaxial with the reference axis 41a.

A driven pawl 90 is positioned at the other end of attachment 40. Pawl 90 is journalled to the housing 41 by way of a matched bearing pair 92 and includes a skirt 91 having three axially extending slots 94, 96 and 98 (not shown) for respectively engaging the interior tangs 82, 84 and 86 of bevel gear 80. The other end of pawl 90 includes a depth adjustment nut 88. Pawl 90 and its skirt 91 also have a central bore and are coaxial with axis 41a.

Figure 2:
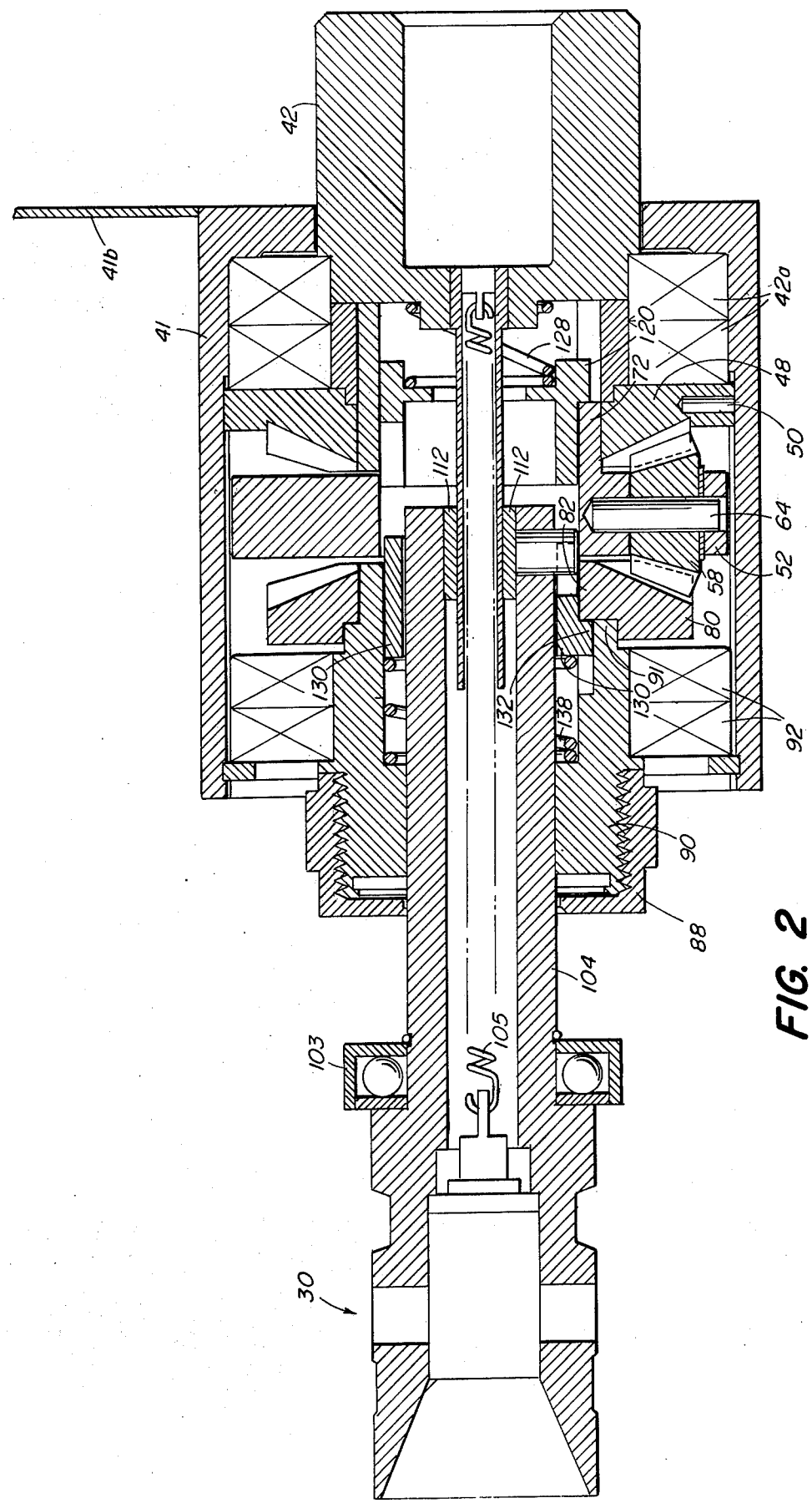
FIG. 2 shows in sectional view, the tapping attachment of FIG. 1.
Figure 3:
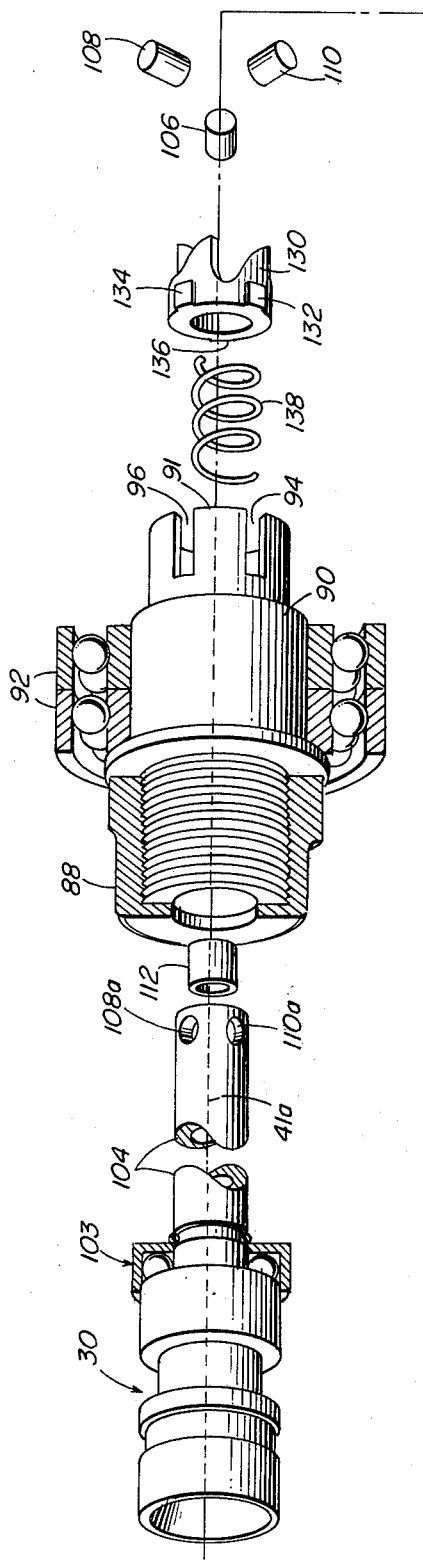
FIG. 3 shows in exploded form, the tapping attachment of FIG. 1.
Figure 3:
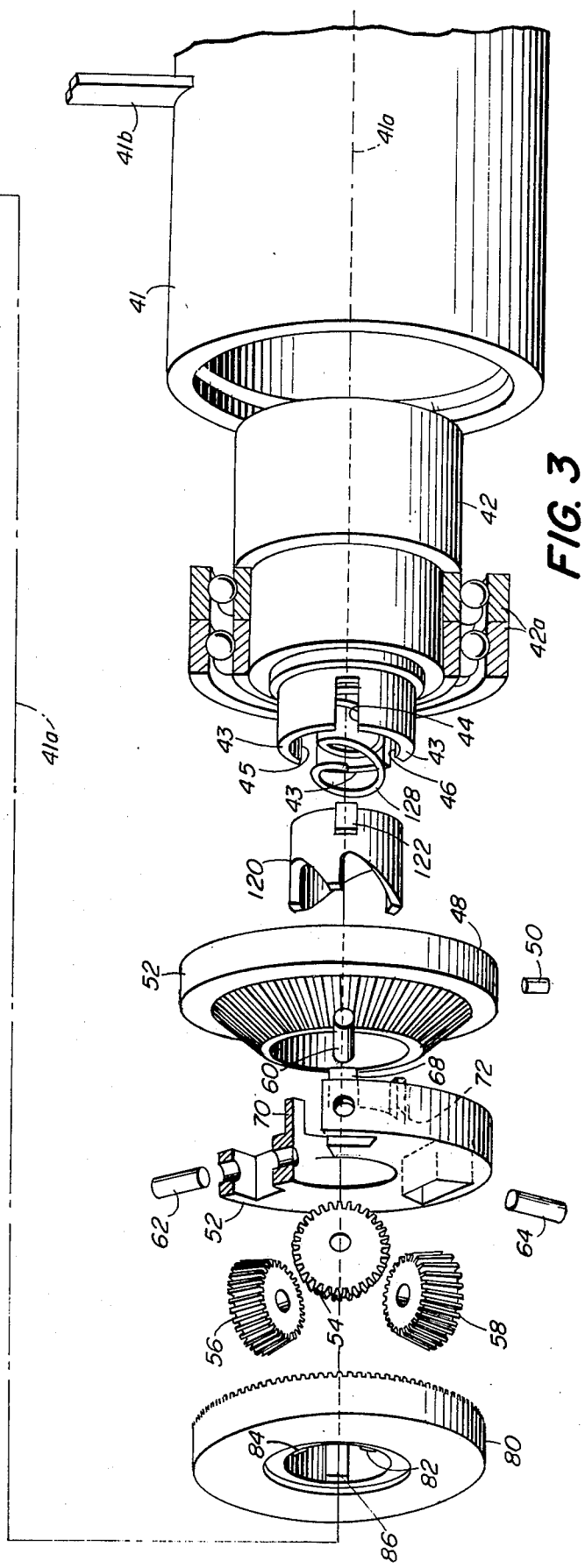

The configuration thus far described is suitable for coupling to the driving shaft 16 of the lathe 10. When so coupled, rotation of the drive shaft 16 is transferred directly to driving pawl 42, which rotates at the same speed in the same direction. The rotational motion of pawl 42 is directly transferred in turn to the carrier 52 (by way of the tangs of the carrier 52 which engage slots 44, 45 and 46 of skirt 43). The pinions 54, 56 and 58 of carrier 52 mutually engage the bevel gears 48 and 80. With gear 48 maintained in a fixed orientation with respect to the housing 41 (by way of pin 50), the bevel gear 80 is driven to rotate in the same direction as the driving pawl 42 (and shaft 16) but at a higher speed than pawl 42, as determined by the gear ratios of the bevel gears and pinions. Driven pawl 90 is in turn driven by the tangs 82, 84 and 86 to rotate in the same direction and at the same speed as bevel gear 80. Accordingly, with the planetary gear arrangement in the present embodiment, the attachment 40 provides two same direction, different speed sources of driving force: (1) the driving pawl 42, and (2) the driven pawl 90. In the configuration of FIGS. 2 and 3, the driving pawl 42 rotates at a low speed relative to the driven pawl 90.

With this configuration, any conventional clutching arrangement (such as dog, pin, ball or friction clutch arrangements) may be utilized to selectively utilize each of these sources for driving the driven shaft 30. In the preferred embodiment, the following dog arrangement is used.

Driven shaft 30 is coupled to driving pawl 42 by a spring 105 in a conventional manner to provide free axial float of the driven shaft and consequent self-feeding of a tool into the workpiece. The driven shaft 30 includes a thrust bearing 103 and extension member 104. Extension member 104 extends through the central bore of driven pawl 90, gears 48 and 80, and carrier 52. Three driven pins 106, 108 and 110 are adapted to extend radially from holes 106a, 108a and 110a, respectively, at the end of extension member 104. A pin retaining sleeve 112 is disposed within extension member 104 to maintain the pins in position.

A first driving dog 120 is positioned within the skirt 43 of pawl 42. Dog 120 includes tangs 122, 124 (not shown) and 126 (not shown), respectively fitting within the slots 44, 45 and 46 of pawl 42 so that dog 120 is driven to rotate with pawl 42. The dog 120 is biased along axis 41a away from pawl 42 by a spring 128.

In a similar manner, a second driving dog 130 is positioned within the skirt 91 of driven pawl 90. Dog 130 includes tangs 132, 134 and 136, respectively fitting within slots 94, 96 and 98 of skirt 91 so that dog 130 is driven to rotate with driven pawl 90. A spring 138 biases dog 130 along axis 41a away from the driven pawl 90.

The dogs 120 and 130, in conjunction with the driven pins 106, 108 and 110, provide a selective clutch arrangement for transferring rotational motion from either driving pawl 42 or from driven pawl 90. In operation, chuck 32 is attached to driven shaft 30 and holds a tapping tool 34. When the tapping tool 34 is biased toward the drive shaft 16 (for example, when inserting tapping tool 34 into a workpiece), the driven pins 106, 108 and 110 of extension member 104 are engaged with the driving dog 120 such that the rotational motion of the drive shaft 16 is coupled by way of pawl 42 to the extension member 104 and to tapping tool 34. As a result, the tapping tool 34 rotates in the same direction as the drive shaft 16 and at the same speed as that shaft. When the tapping tool 34 is biased away from the drive shaft 16 (for example, when extracting tapping tool 34 from a workpiece), the driven pins 106, 108 and 110 of extension 104 are disengaged from the driving dog 120 and engaged with the driving dog 130 such that the relatively high speed rotary motion of bevel gear 80 and driven pawl 90 is coupled to extension member 104 and to tapping tool 34. By appropriately selecting the gear ratios between the bevel and pinion gears, a desired pair of rotational velocities for the tool 34 may be selected in conjunction with the workpiece spindle velocity so that a desired differential tapping tool-workpiece speed may be achieved. The depth adjustment nut 88 may be adjustably positioned with respect to pawl 90 to limit the travel of driven shaft 30 before dog 120 becomes disengaged with pins 106, 108 and 110 and dog 130 becomes engaged, thereby providing location indexed automatic retraction of the tool from the workpiece.

By way of example, in an embodiment where the workpiece spindle rotates at 1,000 rpm in a first direction and the drive shaft 16 rotates at 800 rpm in the same direction, the gear ratios may be adapted so that pawl 42 and pawl 90 both rotate in that first direction but at 800 rpm and 1,600 rpm, respectively. Under these conditions, when the tapping tool 34 is advanced into the workpiece, the tool is biased towards the tapping attachment 40, with the result that pawl 42 and dog 120 drive the tool at the same 800 rpm as the shaft 16. Thus, the tap rotates at 200 rpm slower than the workpiece while the tool self-feeds into the workpiece. When the tapping tool 34 is retracted from the workpiece, the tool is biased away from the tapping attachment, with the result that pawl 90 and driving dog 130 drive the tool at the same 1,600 rpm of pawl 90. Thus, the tool rotates 600 rpm faster than the workpiece while the tool withdraws from the workpiece.

The present embodiment may also be adapted to tap a hole in a workpiece in the opposite sense (e.g., left-hand versus right-hand). In this form, the tapping attachment may be modified by interchanging bevel gears 48 and 80 and by reversing carrier 52. With this configuration, pin 50 still fixes gear 48 with respect to housing 41. The tangs 82, 84 and 86 of gear 80 engage the slots 44, 45 and 46, respectively of pawl 42, and the tangs 68, 70 and 72 of carrier 52 engage the slots 94, 95 and 98 respectively of pawl 90. In this configuration, the gear 80 is driven by pawl 42 and tangs 82, 84 and 86 to rotate at the same speed as pawl 42 (and shaft 16). Carrier 52 is driven by pinions 54, 56 and 58 to rotate in the same direction as pawl 42 but at a lower speed than that pawl. Driven pawl 90 is in turn driven by the tangs 68, 70 and 72 to rotate in the same direction and at the same speed as carrier 52. Accordingly, pawls 42 and 90 also provide two same direction, different speed sources of driving force, but in this configuration, driving pawl 42 rotates at a high speed relative to driven pawl 90.

With this modified configuration, the same clutch arrangement as in the FIGS. 2 and 3 embodiment may be utilized to selectively couple the tapping tool to either pawl 42 or pawl 90 during the insertion and retraction portions of the tapping operation in the same manner as described above.

By way of example, in the modified embodiment, where the workpiece spindle rotates at 1,000 rpm in a first direction and the drive shaft 16 rotates at 1,200 rpm in the same direction, the gear ratios may be adapted so that pawl 42 and pawl 90 both rotate in that first direction but at 1,200 rpm and 600 rpm, respectively. Under these conditions, when the tapping tool 34 is advanced into the workpiece, the tool is biased towards the tapping attachment 40, with the result that pawl 42 and dog 120 drive the tool at the same 1,200 rpm as the shaft 16. Thus, the tap rotates at 200 rpm faster than the workpiece while the tool self-feeds into the workpiece. When the tapping tool 34 is retracted from the workpiece, the tool is biased away from the tapping attachment, with the result that pawl 90 and driving dog 130 drive the tool at the same 600 rpm of pawl 90. Thus, the tool rotates 400 rpm slower than the workpiece while the tool withdraws from the workpiece.

In the above embodiments, the bevel gear 80 and pinions 54, 56 and 58 correspond to the sum and planet gears, respectively, of a planetary configuration operating within a fixed annular ring gear (corresponding to fixed gear 80). Alternatively, the gear 48 may be considered to be the sun gear in a planetary configuration with a fixed sun gear and wherein either the planet gear carrier or ring gear is driven. In alternative embodiments, equivalent planetary configurations may be used in keeping with the present invention, for example, where the sun planet and ring gears all have parallel central axes. Furthermore, the present invention may be configured in another alternative form so that the tool drive shaft is directly coupled to the bevel gear 80 in the configuration of FIGS. 2 and 3; and in yet another alternative form so that the tool drive shaft is directly coupled to the carrier 52 in the above-described modified configuration.

In accordance with the present invention, a relatively small and readily mounted tapping attachment 40 may be provided for operation in conjunction with the lathe 10. Alternatively, one or more of the various work stations of a multiple spindle screw machine, for example, may also be fitted with a tapping attachment 40. As a result, no speed changes are required for the main motor of the multiple station machine or any drive shafts and usual high speed drilling operations may be maintained at some stations while at the same time relatively low speed tapping operations may be performed. With the convenient size and easy attachment of tapping attachment 40, relatively little time is required to set up a machine to accommodate tapping operations, thereby providing a relatively high productivity potential compared to the prior art systems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A tapping attachment for coupling a tapping tool to a machine, said machine including one or more tool drive shafts and associated workpiece spindles, and further including means for driving at least one of said tool drive shafts and its associated spindle in a rotary motion in the same direction about a reference axis, said tapping attachment comprising:

means for coaxially coupling said tool to said one drive shaft and to selectively rotate said tool at one of two rotational velocities about said axis in the same direction as said one drive shaft and its associated spindle, said rotational velocity of said tool being lower than that of said spindle when said tapping tool is biased with respect to said drive shaft along said axis in a first direction, and being higher than that of said spindle when said tapping tool is biased with respect to said drive shaft in the opposite direction along said axis.

2. A tapping attachment according to claim 1 wherein said coupling means comprises:
   A. a planetary gear arrangement including a sun gear, a ring gear, a plurality of planet gears disposed within a carrier and coupling said sun gear and said ring gear, and means to prevent rotation of said ring gear about said reference axis, wherein said planet gears are adapted to couple said sun gear and said ring gear so that said sun gear and said carrier are rotatable at different speeds in the same direction about said reference axis,
   B. clutch assembly and driven shaft, said driven shaft including means for maintaining said tool coaxial with said reference axis, and said clutch assembly including means for selectively coupling said driven shaft to said carrier when said driven shaft is biased in said first direction, and to said sun gear when said driven shaft is biased in said opposite direction.

3. A tapping attachment according to claim 2 wherein said coupling means includes means to directly couple said tool drive shaft to said carrier.

4. A tapping attachment according to claim 3 wherein said sun gear and ring gear are bevel gears coaxial with said reference axis, said carrier is coaxial with said reference axis, and said planet gears are bevel pinion gears, said bevel pinion gears being adapted for rotary motion about pinion axes extending radially from said reference axes.

5. A tapping attachment according to claim 2 wherein said coupling means includes means to directly couple said tool drive shaft to said sun gear.

6. A tapping attachment according to claim 5 wherein said sun gear and ring gear are bevel gears coaxial with said reference axis, said carrier is coaxial with said reference axis, and said planet gears are bevel pinion gears, said bevel pinion gears being adapted for rotary motion about pinion axes extending radially from said reference axes.

7. A tapping attachment according to claim 1 wherein said coupling means comprises:
   A. a planetary gear arrangement including a sun gear, a ring gear, a plurality of planet gears disposed within a carrier and coupling said sun gear and said ring gear, and means to prevent rotation of said ring gear about said reference axis, wherein said planet gears are adapted to couple said sun gear and said ring gear so that said sun gear and said carrier are rotatable at different speeds in the same direction about said reference axis,
   B. clutch assembly and driven shaft, said driven shaft including means for maintaining said tool coaxial with said reference axis, and said clutch assembly including means for selectively coupling said driven shaft to said carrier when said driven shaft is biased in said opposite direction, and to said sun gear when said driven shaft is biased in said first direction.

8. A tapping attachment according to claim 7 wherein said coupling means includes means to directly couple said tool drive shaft to said carrier.

9. A tapping attachment according to claim 8 wherein said sun gear and ring gear are bevel gears coaxial with said reference axis, said carrier is coaxial with said reference axis, and said planet gears are bevel pinion gears, said bevel pinion gears being adapted for rotary motion about pinion axes extending radially from said reference axes.

10. A tapping attachment according to claim 7 wherein said coupling means includes means to directly couple said tool drive shaft to said sun gear.

11. A tapping attachment according to claim 10 wherein said sun gear and ring gear are bevel gears coaxial with said reference axis, said carrier is coaxial with said reference axis, and said planet gears are bevel pinion gears, said bevel pinion gears being adapted for rotary motion about pinion axes extending radially from said reference axes.

* * * * *